(12) United States Patent
Yamasaki et al.

(10) Patent No.: US 11,165,368 B2
(45) Date of Patent: Nov. 2, 2021

(54) VIBRATION WAVE MOTOR AND LENS DRIVE APPARATUS INCLUDING THE VIBRATION WAVE MOTOR

(71) Applicant: CANON KABUSHIKI KAISHA, Tokyo (JP)

(72) Inventors: Ryo Yamasaki, Tokyo (JP); Yasufumi Yamamoto, Kawasaki (JP); Shunsuke Ninomiya, Yokohama (JP); Mai Nakabayashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 16/269,347

(22) Filed: Feb. 6, 2019

(65) Prior Publication Data

US 2019/0245460 A1 Aug. 8, 2019

(30) Foreign Application Priority Data

Feb. 8, 2018 (JP) .............................. JP2018-020884

(51) Int. Cl.
*G02B 7/02* (2021.01)
*H02N 2/02* (2006.01)
(Continued)

(52) U.S. Cl.
CPC .............. *H02N 2/026* (2013.01); *G02B 7/04* (2013.01); *G03B 13/34* (2013.01); *H02N 2/001* (2013.01);
(Continued)

(58) Field of Classification Search
CPC . G02B 7/04; G02B 7/08; G03B 13/34; H02N 2/026; H02N 2/001; H02N 2/004;
(Continued)

(56) References Cited

U.S. PATENT DOCUMENTS

2009/0039806 A1 2/2009 Kudo
2014/0293463 A1* 10/2014 Yamanaka ............. H02N 2/004
359/824

(Continued)

FOREIGN PATENT DOCUMENTS

JP 5230994 B2 7/2013
JP 2017014851 A1 * 1/2017
WO 2018/139581 A1 8/2018

OTHER PUBLICATIONS

European Search Report dated Aug. 13, 2019, Reference: EP84528, Application No. 19155745.3-1212.

*Primary Examiner* — Mahidere S Sahle
(74) *Attorney, Agent, or Firm* — Canon U.S.A., Inc., IP Division

(57) ABSTRACT

A vibration wave motor including: a vibrator; a friction member; and a pressurizing member configured to press the vibrator and the friction member into contact with each other. The vibrator and the friction member are relatively moved in a direction orthogonal to the pressurizing direction of the pressurizing member by vibrations generated on the vibrator, the vibrator and the friction member are configured so as to move in parallel with the pressurizing direction with respect to a fixed member, and the vibration wave motor further includes at least one first restricting portion that restricts a movable amount of the friction member in the pressurizing direction and at least one second restricting portion that restricts a movable amount of the vibrator in the pressurizing direction, such that the movable amount of the friction member is smaller than the movable amount of the vibrator in the pressurizing direction.

11 Claims, 8 Drawing Sheets

(51) Int. Cl.
  *H02N 2/00* (2006.01)
  *G03B 13/34* (2021.01)
  *G02B 7/04* (2021.01)
  *G02B 7/08* (2021.01)

(52) U.S. Cl.
  CPC ............. *H02N 2/004* (2013.01); *H02N 2/006* (2013.01); *H02N 2/0055* (2013.01); *H02N 2/0065* (2013.01); *G02B 7/08* (2013.01)

(58) Field of Classification Search
  CPC .... H02N 2/0055; H02N 2/006; H02N 2/0065; H02N 2/04
  USPC ........................................................ 359/824
  See application file for complete search history.

(56) References Cited

U.S. PATENT DOCUMENTS

2016/0164436 A1  6/2016  Nishitani
2019/0348928 A1* 11/2019  Yamamoto ........... H02N 2/0065

* cited by examiner

VIBRATION WAVE MOTOR AND LENS DRIVE APPARATUS INCLUDING THE VIBRATION WAVE MOTOR

BACKGROUND OF THE INVENTION

Field of the Invention

The present disclosure relates to a vibration wave motor and a lens drive apparatus including the vibration wave motor.

Description of the Related Art

A drive unit disclosed in Japanese Patent No. 5230994 is applied to a vibration isolation mechanism and thus drives a photographing element with two axes. In consideration of a configuration with a single axis, a vibrator and a sliding plate are held by a pressing mechanism and balls are disposed on the sliding plate, thereby drawing power.

In the drive unit disclosed in Japanese Patent No. 5230994, however, an impulsive force applied opposite to the pressing direction of the pressing mechanism may displace and deviate the vibrator, the sliding plate, and the balls in the pressing direction. The sliding plate in particular has a relatively large weight and several hundreds to several thousands Gs of force caused by drop impact or the like may seriously damage the vibrator, increasing the risk of destruction.

SUMMARY OF THE INVENTION

A vibration wave motor including: a vibrator including a vibrating element and a piezoelectric element; a friction member; and a pressurizing member configured to pressurize the vibrator and the friction member into contact with each other. The vibrator and the friction member are relatively moved in a direction orthogonal to the pressurizing direction of the pressurizing member by vibrations generated on the vibrator, the vibrator and the friction member are configured so as to move in parallel with the pressurizing direction with respect to a fixed member that does not move according to the movement of the vibrator and the friction member in the direction of the relative movement, and the vibration wave motor further includes at least one first restricting portion that restricts a movable amount of the friction member in the pressurizing direction and at least one second restricting portion that restricts a movable amount of the vibrator in the pressurizing direction, such that the movable amount of the friction member is smaller than the movable amount of the vibrator in the pressurizing direction.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

First Embodiment

Figure 1:
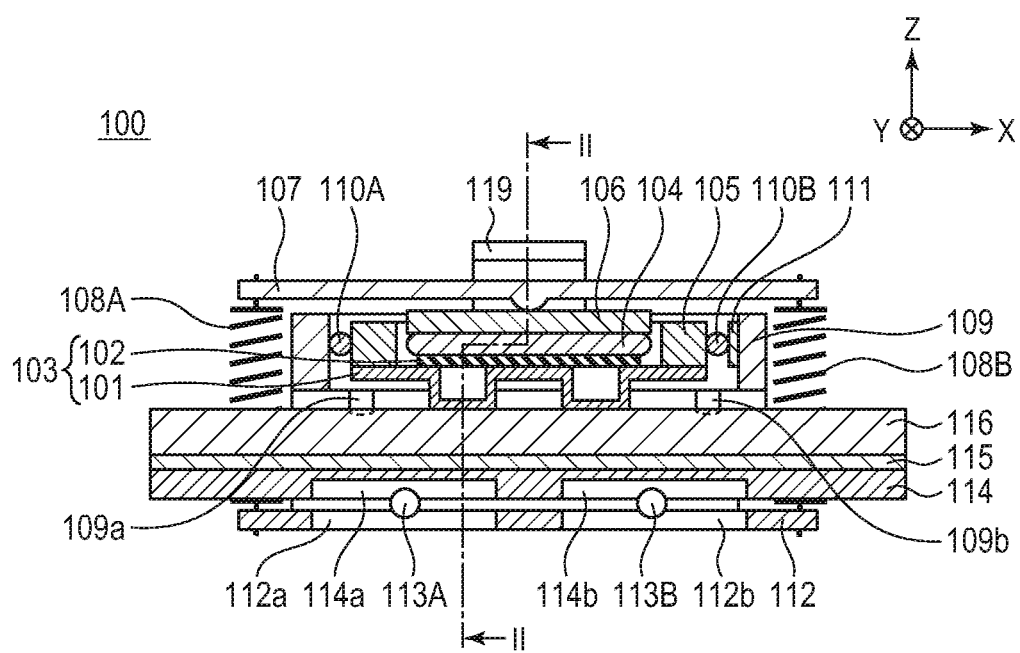
FIG. 1 is a cross-sectional view illustrating the principal part of a vibration wave motor (100) according to a first embodiment.
Figure 2:
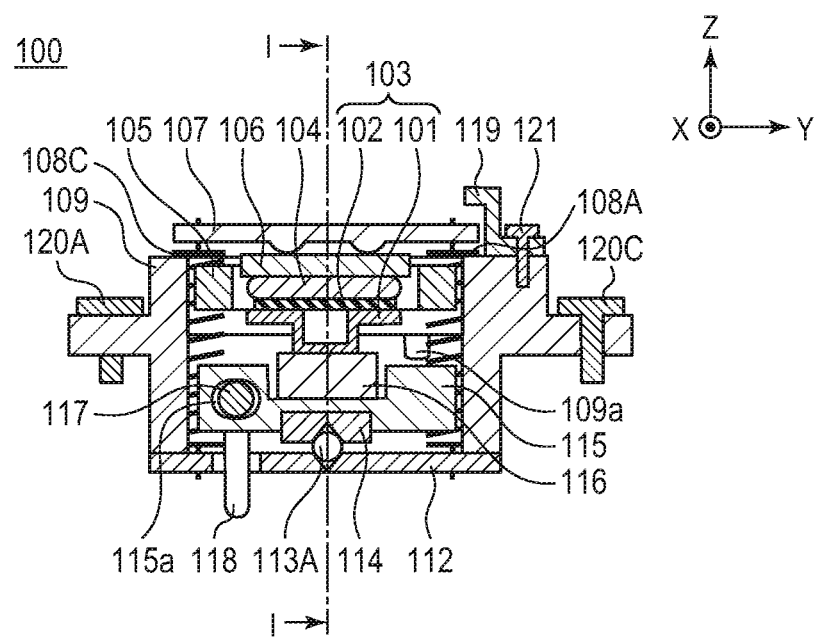
FIG. 2 is a cross-sectional view illustrating the principal part of the vibration wave motor (100) according to the first embodiment.
Figure 3:
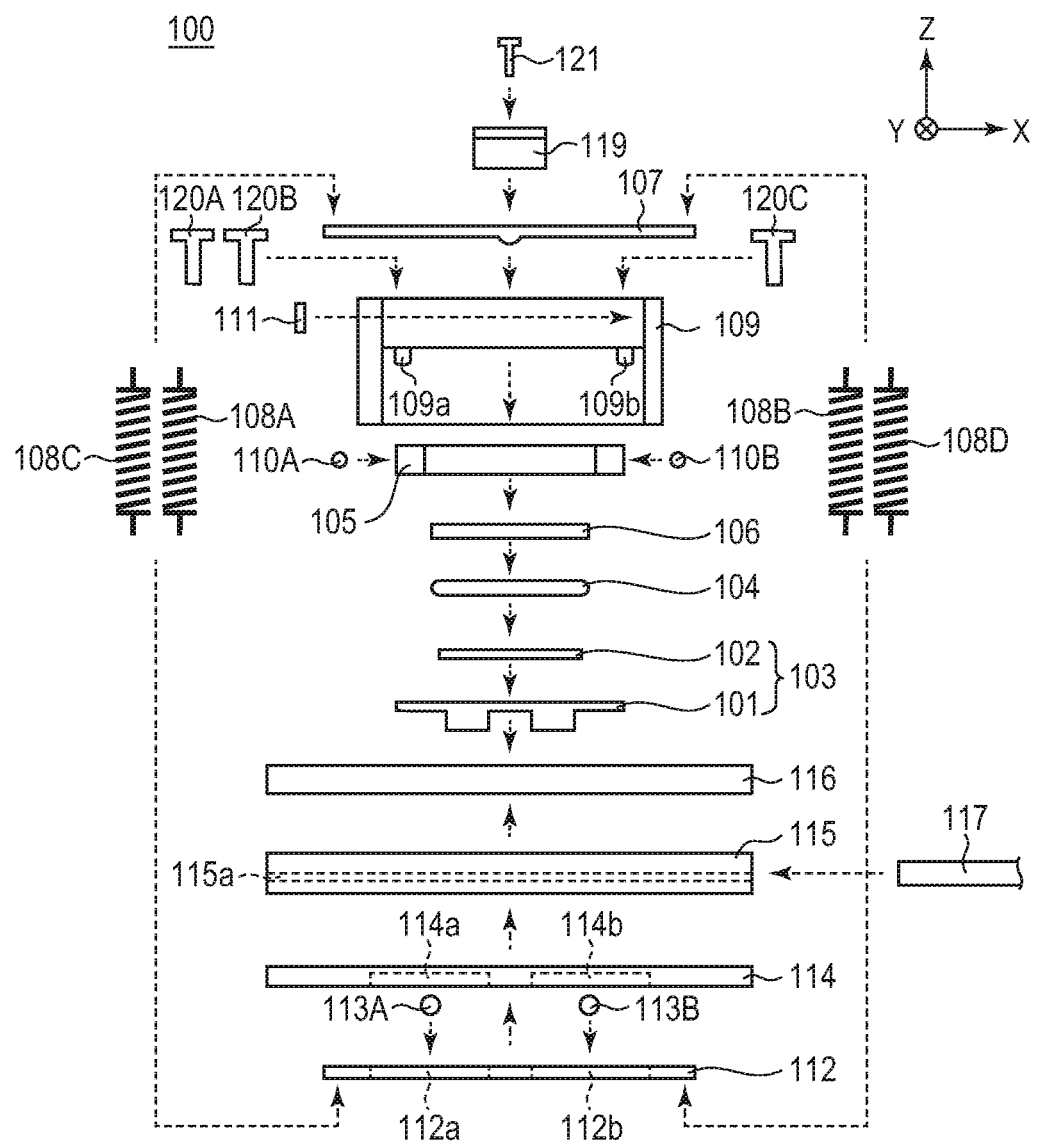
FIG. 3 is an exploded view illustrating the vibration wave motor (100) according to the first embodiment.

A first embodiment will be specifically described blow in accordance with accompanying FIGS. 1 to 3. In the drawings, the direction of relative movement is defined as X direction, the pressurizing direction is defined as Z direction, and a direction orthogonal to both of X direction and Z direction is defined as Y direction.

FIG. 1 is a cross-sectional view illustrating a principal part of a vibration wave motor 100 according to the first embodiment, taken along line I-I of FIG. 2. FIG. 2 is a cross-sectional view illustrating the principal part of the vibration wave motor 100, taken along line II-II of FIG. 1. FIG. 3 is an exploded view schematically illustrating the configuration of the vibration wave motor 100.

The vibration wave motor 100 (ultrasonic motor) is provided with a vibrator 103 including a vibrating element 101 and a piezoelectric element 102. The vibrating element 101 and the piezoelectric element 102 are fixed with an adhesive or the like. The vibrating element 101 has two protrusions and is in frictional contact with a friction member 116, which will be discussed later. FIG. 2 illustrates only one of the protrusions.

A vibrator holding member 105 holds the overall vibrator 103. A vibration cut-off member 104 is disposed on the piezoelectric element 102 in Z direction and prevents vibrations generated on the vibrator 103 from being transmitted to other members provided on the vibration cut-off member 104 in Z direction. In many cases, the vibration cut-off member 104 is a fibrous member, for example, a felt member.

A first transmitting member 106 and a second transmitting member 107 that are adapted to transmit a pressure are disposed on the vibration cut-off member 104 in Z direction. Pressure springs 108A, 108B, 108C and 108D generate a pressure for pressurizing the vibrator 103 and the friction member 116 into contact with each other. In the first embodiment, the pressure springs are four tension springs. The four tension springs are disposed in the depth direction perpendicular to the plane of this figure (Y direction) and thus only the pressure springs 108A and 108B are illustrated in FIG. 1. The first transmitting member 106, the second transmitting member 107 and the pressure springs 108A, 108B, 108C and 108D are equivalent to a pressurizing member described in claims.

A holding member 109 is a member for holding the vibrator holding member 105. Rollers 110A and 110B and a backlash eliminating spring 111 are provided between the holding member 109 and the vibrator holding member 105. With this configuration, the holding member 109 and the vibrator holding member 105 are connected in X direction without causing backlashes. The vibrator holding member 105 is held so as to move in Z direction with respect to the holding member 109. In other words, the vibrator holding member 105 holding the vibrator 103 is held by the holding member 109, so that the vibrator 103 is held by the holding member 109. Moreover, the holding member 109 has holes for the engagement of three screw members 120A, 120B and 120C. The holding member 109 is fixed to a housing, which is not illustrated, with the three spring members 120A, 120B and 120C. In other words, the holding member 109 is a fixed member that does not move according to the movement of the vibrator 103 and the friction member 116 in the direction of the relative movement. The holding member 109 further includes restricting portions 109a and 109b that restrict a movement of the friction member 116 in Z direction when the movement is caused by an impulsive force of dropping or the like. The restricting portions 109a and 109b are equivalent to first restricting portions described in the claims, however it is sufficient that at least one first restricting portion is provided.

A fixed-side guide member 112 has guide grooves 112a and 112b that hold two rolling balls 113A and 113B (rolling members) and are connected to the holding member 109. A movable-side guide member 114 has guide grooves 114a and 114b that hold the two rolling balls 113A and 113B. The two rolling balls 113A and 113B are held between the fixed-side guide member 112 and the movable-side guide member 114 by a pressure of the pressure springs 108A, 108B, 108C and 108D.

The friction member holding member 115 holds the movable-side guide member 114 and the friction member 116. The friction member holding member 115 further includes a long hole 115a extending in Y direction. The long hole 115a contains a rod guide member 117 extending in X direction. The guide member 117 is loosely fit to the friction member holding member 115 in Z direction in the long hole 115a. The guide member 117 guides the friction member holding member 115, which holds the friction member 116, in X direction and has both ends held by a housing, which is not illustrated, provided outside the vibration wave motor 100. The friction member 116 has a frictional contact surface on the top surface of the friction member 116 in Z direction such that the frictional contact surface is in contact with the vibrator 103. The undersurface of the friction member 116 is fixed to the friction member holding member 115. In other words, the vibrator 103 and the friction member 116 are configured so as to move substantially in parallel with the pressurizing direction with respect to the holding member 109.

With this configuration, the movable-side guide member 114, the friction member holding member 115 and the friction member 116 are integrally guided so as to move in X direction with respect to the fixed-side guide member 112 by the rolling balls 113A and 113B. Furthermore, the guide member 117 is loosely fit into the extending long hole 115a of the friction member holding member 115. The guide member 117 restricts a rotation about an axis passing around the center of the rolling balls 113A and 113B in parallel with X direction. Thus, the movable-side guide member 114, the friction member holding member 115 and the friction member 116 can be linearly driven with stability in X direction.

The vibration wave motor 100 includes a power drawing part 118. The power drawing part 118 is connected to a member to be driven, enabling linear driving of the member to be driven. The vibration wave motor 100 further includes a restricting member 119 fixed to the holding member 109 with a screw member 121. The restricting member 119 restricts a movement of the vibrator 103 in Z direction when the movement is caused by an impulsive force of dropping or the like. The restricting member 119 is equivalent to a second restricting portion described in the claims.

In the vibration wave motor 100 configured thus, the friction member 116 is relatively moved in X direction by high-frequency vibrations (high-frequency vibrations at the frequencies of an ultrasonic range) generated on the vibrator 103, achieving linear driving. In the first embodiment, the friction member 116 is moved while the vibrator 103 is fixed. In an actual configuration, the piezoelectric element 102 of the vibrator 103 has a flexible printed wiring board for supplying a driving voltage and a driving circuit for generating the driving voltage. The illustration and description thereof are omitted.

In the following description, the vibration wave motor 100 receives an impulsive force of dropping or the like and a force not smaller than the pressure of the pressurizing member is generated in the extending direction of the pressure springs 108A, 108B, 108C and 108D. For example, in FIG. 2, when an impulsive force rotates the friction member 116 around the guide member 117 and pushes the vibrator 103 upward in Z direction, the rolling balls 113A and 113B may deviate from the guide grooves 112a, 112b, 114a and 114b. Moreover, the pressure springs 108A, 108B, 108C and 108D may be extended and plastically deformed.

However, the vibration wave motor 100 includes the restricting member 119 that restricts a movement of the vibrator 103 and the friction member 116 in Z direction, thereby preventing deviation of the components. For the risk of damage to the vibrator 103 by a collision between the vibrator 103 and the friction member 116, the restricting portions 109a and 109b are provided. The damage caused by an impulsive force is avoided by adjusting a clearance of each of the members in contact with the restricting portions 109a and 109b and the restricting member 119. The configuration will be discussed in detail.

Figure 4A:
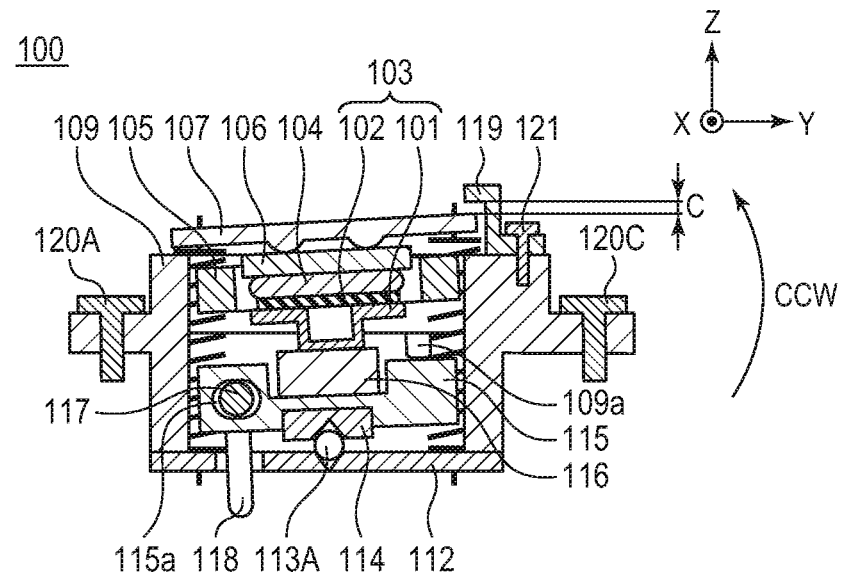
FIGS. 4A and 4B are cross-sectional views illustrating the principal part of the vibration wave motor (100) according to the first embodiment in a state where an impulsive force is applied.
Figure 4B:
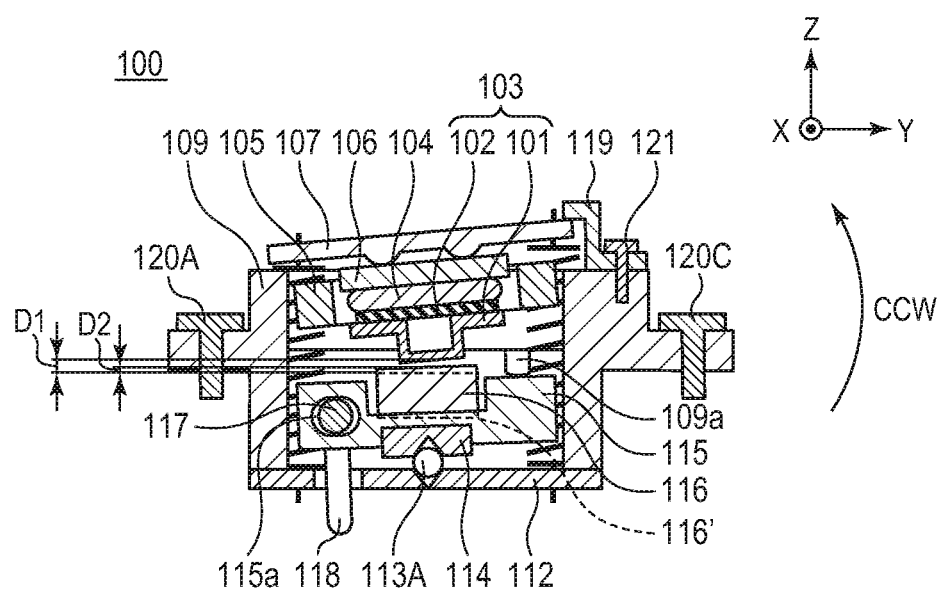

FIGS. 4A and 4B are cross-sectional views illustrating the principal part of the vibration wave motor 100 as in FIG. 2. FIG. 4A illustrates a first state where a small impulsive force of dropping or the like is applied. FIG. 4B illustrates a second state where a large impulsive force of dropping or the like is applied. The members not illustrated in the drawings will be described in parentheses. In FIG. 4A, the movable-side guide member 114, the friction member holding member 115 and the friction member 116 integrally rotate about the guide member 117 counterclockwise (CCW). The friction member holding member 115 comes into contact with the restricting portion 109a (109b). Thus, the restricting portion 109a (109b) restricts a movement of the friction member 116 in Z direction. At this point, a gap between the friction member 116 and the restricting portion 109a (109b) in Z direction for preventing deviation of the rolling balls 113A and 113B is determined based on the amount of insertion of the rolling balls 113A and 113B into the guide grooves 112a, 112b, 114a and 114b.

Moreover, the rotation of the friction member 116 causes the vibrator 103, the vibration cut-off member 104, the vibrator holding member 105, the first transmitting member 106 and the second transmitting member 107 to integrally move in Z direction. These members are disposed above the friction member 116 in Z direction. In FIG. 4A, however, the restricting member 119 and the second transmitting member 107 are separated from each other with a clearance C made therebetween in Z direction. The vibrator 103 does not receive a force other than the pressure of the pressure springs 108A, 108B, 108C and 108D. Strictly speaking, the pressure is increased by extending the springs but is sufficiently small relative to an impulsive force, so that the increase is negligible.

FIG. 4B illustrates the second state where a larger impulsive force is applied than in FIG. 4A. As in FIG. 4A, the movable-side guide member 114, the friction member holding member 115 and the friction member 116 integrally rotate about the guide member 117 counterclockwise (CCW). The friction member holding member 115 comes into contact with the restricting portions 109a and 109b. Thus, the restricting portions 109a and 109b restrict a movement of the friction member 116 in Z direction. Moreover, the vibrator 103, the vibration cut-off member 104, the vibrator holding member 105, the first transmitting member 106 and the second transmitting member 107, which are disposed above the friction member 116 in Z direction, integrally move in Z direction, such that the second transmitting member 107 comes into contact with the restricting member 119. Thus, the restricting member 119 restricts a movement of the vibrator 103 in Z direction. At this point, the vibrator 103 is not in contact with the friction member 116 and thus is prevented from destructively colliding with the friction member 116 by an impulsive force.

A dotted line 116' indicates the position of the friction member 116 in a normal state of FIG. 2. The vibrator 103 restricted by the restricting member 119 is moved in Z direction by a movement D1. The movement D1 corresponds to a movable amount of the vibrator 103 in Z direction. Moreover, the friction member 116 restricted by the restricting portions 109a and 109b are moved in Z direction by a movement D2. The movement D2 corresponds to a movement of the vibrator 116 in Z direction. At this point, the dimensions of the restricting portions 109a and 109b and the restricting member 119 in Z direction are set such that the movement D1 and the movement D2 have the relationship of expression (1) below. Furthermore, a gap (D1-D2) is formed between the vibrator 103 and the friction member 116.

$$D1 > D2 \qquad (1)$$

According to the relationship of expression (1), the vibrator 103 and the friction member 116 do not come into contact with each other but separate from each other when receiving a large impulsive force. This prevents the vibrator 103 from colliding with the friction member 116, so that the vibrator 103 is not damaged by an impulsive force. Although the pressure springs 108A, 108B, 108C and 108D are extended in Z direction, the restricting member 119 is provided to prevent plastic deformation and retain the pressure springs 108A, 108B, 108C and 108D. Furthermore, the movement D2 of the friction member 116 restricted by the restricting portions 109a and 109b is smaller than the diameters of the rolling balls 113A and 113B. Thus, the rolling balls 113A and 113B do not deviate even when the friction member 116 moves.

According to the first embodiment, this configuration can prevent deviation of the components and damage to the vibrator 103 even when an impulsive force is applied to the vibration wave motor 100, thereby keeping satisfactory performance for the motor.

Second Embodiment

A second embodiment is different from the first embodiment in that a first vibrator 203A and a second vibrator 203B are provided to constitute a high thrust vibration wave motor 200. The same configurations as those of the first embodiment will not be described in detail. The second vibrator 203B identical in configuration to the first vibrator 203A and members associated with the second vibrator 203B are described in parentheses. The detailed description thereof is omitted. The members not illustrated in the drawings are described in parentheses.

Figure 5:
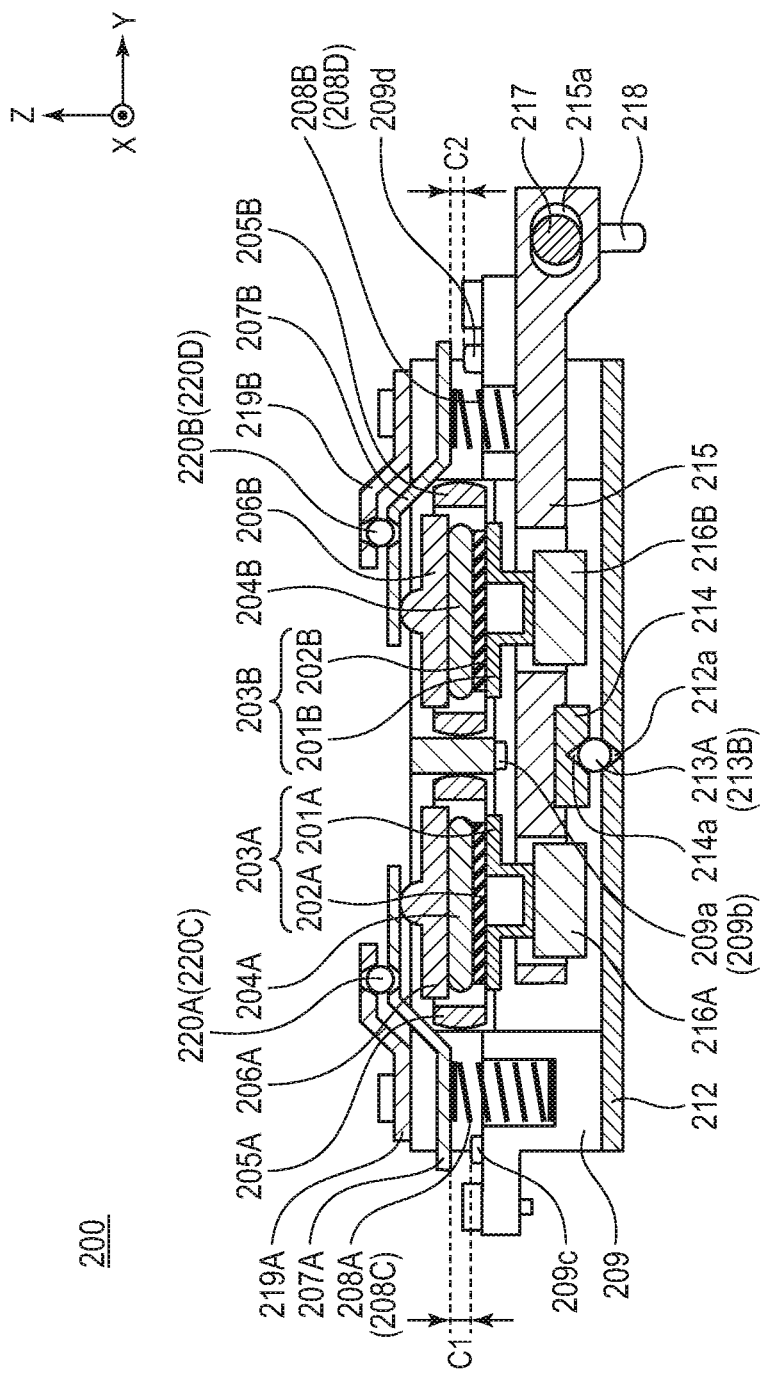
FIG. 5 is a cross-sectional view illustrating the principal part of a vibration wave motor (200) according to a second embodiment.

FIG. 5 is a cross-sectional view illustrating a principal part of a vibration wave motor 200 according to the second embodiment, taken along Y direction. As described above, the vibration wave motor 200 includes the first vibrator 203A, the second vibrator 203B, and members for the respective vibrators. The first vibrator 203A includes a vibrating element 201A and a piezoelectric element 202A. The vibrating element 201A and the piezoelectric element 202A are fixed with an adhesive or the like. As in the first embodiment, two protrusions are provided in frictional contact with a friction member 216A. FIG. 5 illustrates only one of the protrusions. The second vibrator 203B is identical in configuration to the first vibrator 203A.

A vibrator holding member 205A holds the overall first vibrator 203A. A vibration cut-off member 204A is disposed on the piezoelectric element 202A in Z direction and prevents vibrations generated on the first vibrator 203A from being transmitted to other members provided on the vibration cut-off member 204A in Z direction.

A first transmitting member 206A (206B), a second transmitting member 207A (207B), a third transmitting member 219A (219B) and rolling balls 220A, 220B, 220C and 220D are disposed on the vibration cut-off member 204A (204B) in Z direction. In the second embodiment, pressure springs 208A, 208B, 208C and 208D are four compression springs. The four compression springs are disposed in the depth direction perpendicular to the plane of this figure (X direction) and thus only the pressure springs 208A and 208B are illustrated in FIG. 5. The rolling balls 220A, 220B, 220C and 220D are also disposed in the depth direction perpendicular to the plane of this figure (X direction) and thus only the rolling balls 220A and 220B are illustrated.

The spring force of the pressure springs 208A to 208D in Z direction allows the second transmitting member 207A (207B) to pivot about the rolling balls 220A to 220D. The second transmitting member 207A (207B) comes into contact with a contact part protruding in Z direction from the first transmitting member 206A (206B), transmits a spring force through the contact part, and brings the first vibrator 203A (203B) into frictional contact with the friction member 216A (216B). The first transmitting member 206A (206B), the second transmitting member 207A (207B), the third transmitting member 219A (219B), the pressure springs 208A to 208D and the rolling balls 220A to 220D are equivalent to a pressurizing member described in claims.

A holding member 209 is a member for holding the vibrator holding member 205A (205B). Rollers (not illustrated) and a backlash eliminating spring (not illustrated) are provided between the holding member 209 and the vibrator holding member 205A (205B). With this configuration, the holding member 209 and the vibrator holding member 205A (205B) are connected in X direction without backlashes. The vibrator holding member 205A (205B) is held so as to move in Z direction with respect to the holding member 209. The holding member 209 further includes restricting portions 209a and 209b that restrict a movement of the friction member 216A (216B) in Z direction when the movement is caused by an impulsive force of dropping or the like. The restricting portions 209a and 209b are disposed in the depth direction perpendicular to the plane of this figure (X direction) in FIG. 5 and thus only the restricting portion 209a is illustrated. The restricting portions 209a and 209b are equivalent to first restricting portions described in the claims.

The holding member 209 further includes restricting portions 209c and 209d that restrict a movement of the first vibrator 203A (203B) in Z direction when the movement is caused by an impulsive force of dropping or the like. The restricting portions 209c and 209d are equivalent to second restricting portions described in the claims. The restriction of the actions of the first vibrator 203A (203B) and the friction member 216A (216B) will be specifically described later.

A friction member holding member 215 holds a movable-side guide member 214 and the friction member 216A (216B). The friction member holding member 215 further includes a long hole 215a extending in Y direction. The long hole 215a contains a rod guide member 217 extending in X direction. The guide member 217 is loosely fit to the friction member holding member 215 in Z direction in the long hole 215a. The guide member 217 guides the friction member holding member 215, which holds the friction member 216A (216B), in X direction and has both ends held by a housing, which is not illustrated, provided outside the vibration wave motor 200. The friction member 216A (216B) has a frictional contact surface on the top surface of the friction member 216A (216B) in Z direction such that the frictional contact surface is in contact with the first vibrator 203A (203B). The undersurface of the friction member 216A (216B) is fixed to the friction member holding member 215. In other words, the first vibrator 203A (203B) and the friction member 216A (216B) are configured so as to move substantially in parallel with the pressurizing direction with respect to the holding member 209.

With this configuration, the movable-side guide member 214, the friction member holding member 215 and the friction member 216A (216B) are integrally guided so as to move in X direction with respect to the fixed-side guide member 212 by the rolling balls 213A and 213B. Furthermore, the guide member 217 is loosely fit into the extending long hole 215a of the friction member holding member 215. The guide member 217 restricts a rotation about an axis passing around the center of the rolling balls 213A and 213B in parallel with X direction. Thus, the movable-side guide member 214, the friction member holding member 215 and the friction member 216A (216B) can be linearly driven with stability in X direction.

The vibration wave motor 200 includes a power drawing part 218. The power drawing part 218 is connected to a member to be driven, enabling linear driving of the member. The third transmitting member 219A (219B) receives the spring force of the pressure springs 208A to 208D through the second transmitting member 207A (207B) and the rolling balls 220A to 220D. However, the third transmitting member 219A (219B) is fixed to the holding member 209 with a screw member, thereby restricting the movements of the second transmitting member 207A (207B) and the rolling balls 220A to 220D in Z direction.

In the vibration wave motor 200 configured thus, the friction member 216A (216B) is relatively moved in X direction by high-frequency vibrations generated on the first vibrator 203A (203B), achieving linear driving. The provision of the first vibrator 203A and the second vibrator 203B can obtain a thrust substantially twice as large as that of the first embodiment. The behaviors of the first vibrator 203A (203B) and the friction member 216A (216B) in the event of an impulsive force of dropping or the like will be specifically discussed below.

Figure 6:
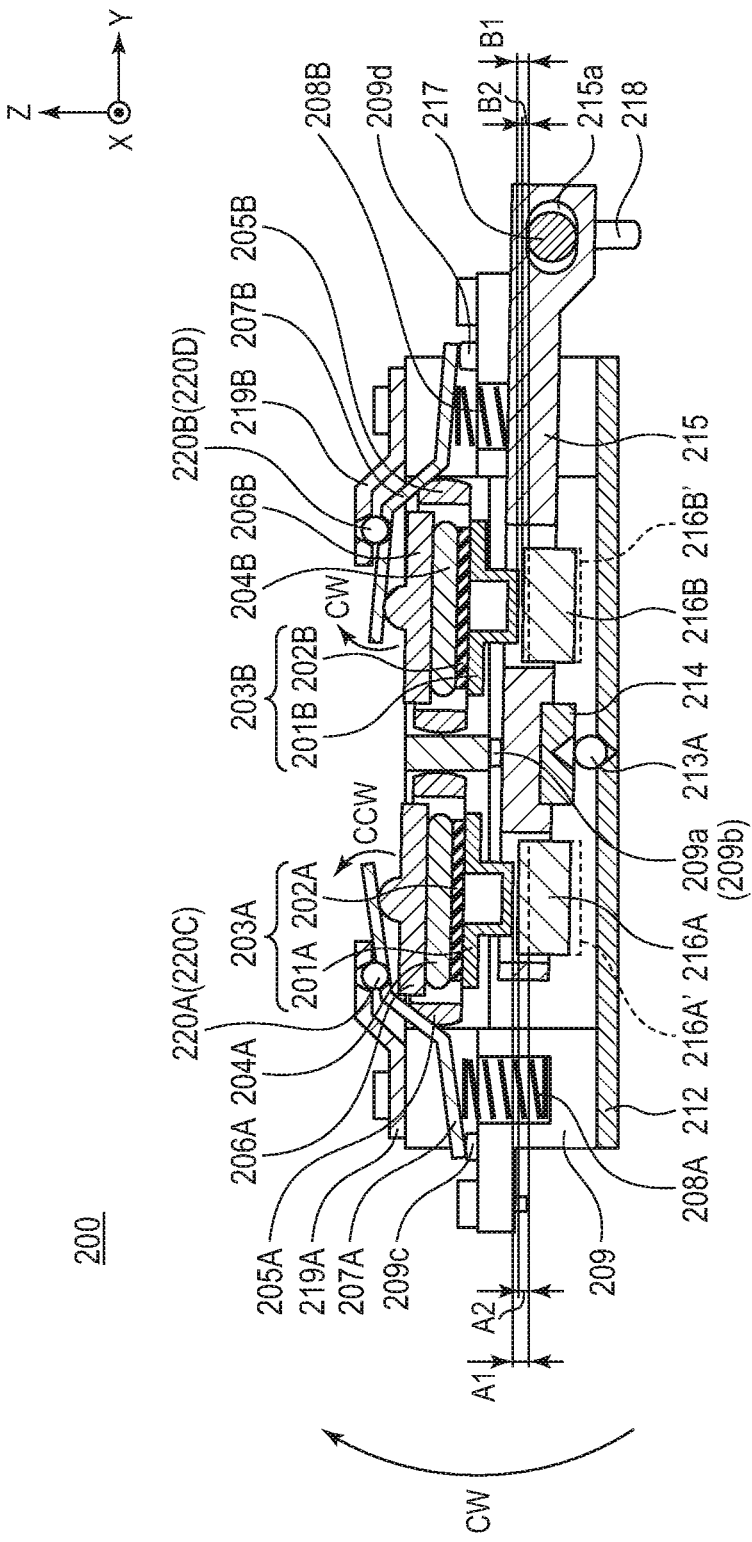
FIG. 6 is a cross-sectional view illustrating the principal part of the vibration wave motor (200) according to the second embodiment in a state where an impulsive force is applied.

FIG. 6 is a cross-sectional view illustrating the principal part of the vibration wave motor 200 as FIG. 5, the motor receiving an impulsive force of dropping or the like. In FIG. 6, the movable-side guide member 214, the friction member holding member 215 and the friction member 216A (216B) integrally rotate about a guide member 217 clockwise (CW). The friction member holding member 215 comes into contact with the restricting portion 209a (209b). Thus, the restricting portion 209a (209b) restricts a movement of the friction member 216A (216B) in Z direction.

Moreover, the first vibrator 203A, the vibration cut-off member 204A, the vibrator holding member 205A and the first transmitting member 206A integrally move in Z direction. These members are disposed above the friction member 216 in Z direction. One end of the second transmitting member 207A is in contact with a contact part protruding from the first transmitting member 206A in Z direction. The second transmitting member 207A rotates counterclockwise (CCW) about an axis passing through the center of the rolling ball 220A (220C) in parallel with X direction. Furthermore, the second transmitting member 207A rotates until the other end of the second transmitting member 207A comes into contact with the restricting portion 209c. Thus, the restricting portion 209c restricts a movement of the first vibrator 203A in Z direction. At this point, the first vibrator 203A is not in contact with the friction member 216A and thus is prevented from destructively colliding with the friction member 216A by an impulsive force.

A dotted line 216A' indicates the position of the friction member 216A in a normal state of FIG. 5. The first vibrator 203A restricted by the restricting portion 209c is moved in Z direction by a movement A1. Moreover, the friction member 216A restricted by the restricting portion 209a (209b) is moved in Z direction by a movement A2. At this point, the dimensions of the restricting portions 209a, 209b and 209c in Z direction are set such that the movement A1 and the movement A2 have the relationship of expression (2) below. Furthermore, a gap (A1-A2) is formed between the first vibrator 203A and the friction member 216.

$$A1 > A2 \qquad (2)$$

Likewise, the second vibrator 203B, the vibration cut-off member 204B, the vibrator holding member 205B and the first transmitting member 206B integrally move in Z direction. These members are disposed above the friction member 216B in Z direction. One end of the second transmitting member 207B is in contact with a contact part protruding from the first transmitting member 206B in Z direction. The second transmitting member 207B rotates clockwise (CW) about an axis passing through the center of the rolling ball 220B (220D) in parallel with X direction. Furthermore, the second transmitting member 207B rotates until the other end of the second transmitting member 207B comes into contact with the restricting portion 209d. Thus, the restricting portion 209d restricts a movement of the second vibrator 203B in Z direction. At this point, the second vibrator 203B is not in contact with the friction member 216B and thus is prevented from destructively colliding with the friction member 216B by an impulsive force.

A dotted line 216B' indicates the position of the friction member 216B in a normal state of FIG. 5. The second vibrator 203B restricted by the restricting portion 209*d* is moved in Z direction by a movement B1. Moreover, the friction member 216B restricted by the restricting portion 209*a* (209*b*) is moved in Z direction by a movement B2. At this point, the dimensions of the restricting portions 209*a*, 209*b* and 209*d* in Z direction are set such that the movement B1 and the movement B2 have the relationship of expression (3) below. Furthermore, a gap (B1-B2) is formed between the second vibrator 203B and the friction member 216B.

$$B1 > B2 \tag{3}$$

According to the relationship of expressions (2) and (3), the first vibrator 203A (203B) and the friction member 216A (216B) do not come into contact with each other but separate from each other when receiving a large impulsive force. This prevents the first vibrator 203A (203B) from being damaged by an impulsive force of the friction member 216A (216B).

As illustrated in FIG. 5, a clearance C1 between restricting portion 209*c* and the second transmitting member 207A is set larger than a clearance C2 between the restricting portion 209*d* and the second transmitting member 207B. As illustrated in FIG. 6, the friction member 216A (216B) rotated about the guide member 217, so that the movement A2 of the friction member 216A in Z direction is larger than the movement B2 of the friction member 216B in Z direction. Furthermore, the movement A2 of the friction member 216A is smaller than the diameters of the rolling balls 213A and 213B. Thus, the rolling balls 213A and 213B do not deviate even when the friction member 216A moves.

According to the second embodiment, this configuration can prevent deviation of the components and damage to the first vibrator 203A (203B) even when an impulsive force is applied to the vibration wave motor 200, thereby keeping satisfactory performance for the motor.

Application Example

Figure 7:
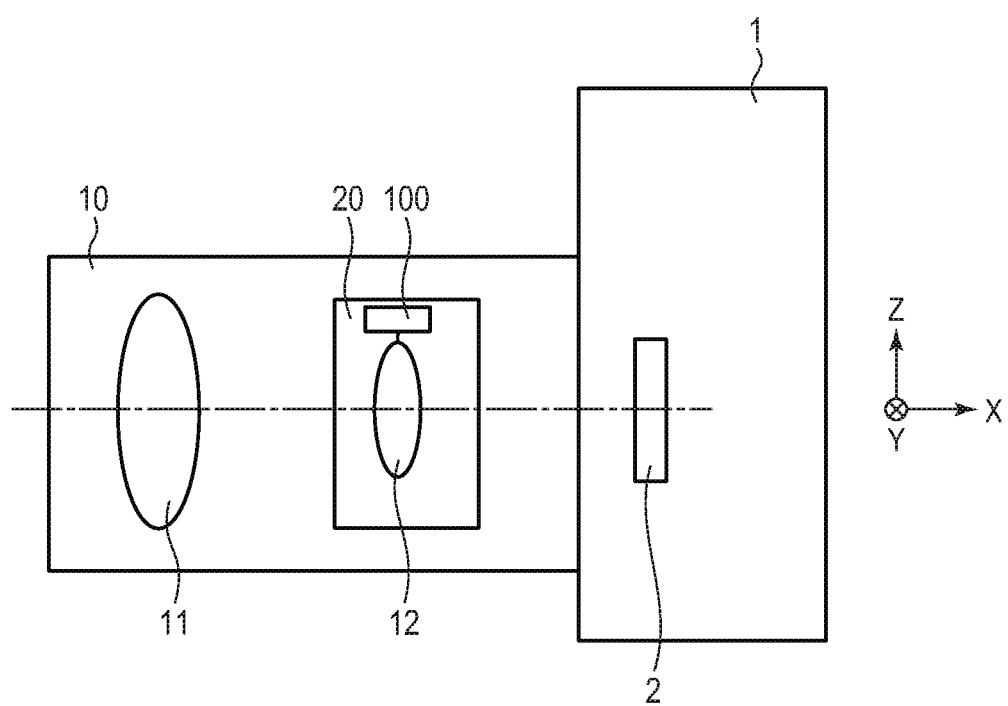
FIG. 7 is a schematic diagram illustrating a lens drive apparatus (10) and a camera apparatus (1).

An application example of the vibration wave motor 100 in a lens drive apparatus 10 according to the first embodiment will be described below. FIG. 7 is a schematic diagram illustrating the lens drive apparatus 10 and a camera apparatus 1. The lens drive apparatus 10 includes a lens part 11 and a focus unit 20. The focus unit 20 includes the vibration wave motor 100 and a focus lens part 12. The lens drive apparatus 10 is attached to the camera apparatus 1 including a photographing element 2 that receives a light beam passing through the lens part 11 and the focus lens part 12. With this configuration, a focus is detected based on an image signal acquired by the photographing element 2, and then the vibration wave motor 100 drives the focus lens part 12 in X direction based on the result of focus detection. The vibration wave motor 100 is driven and controlled so as to achieve focus on the photographing element 2 by driving the focus lens part 12.

Figure 8:
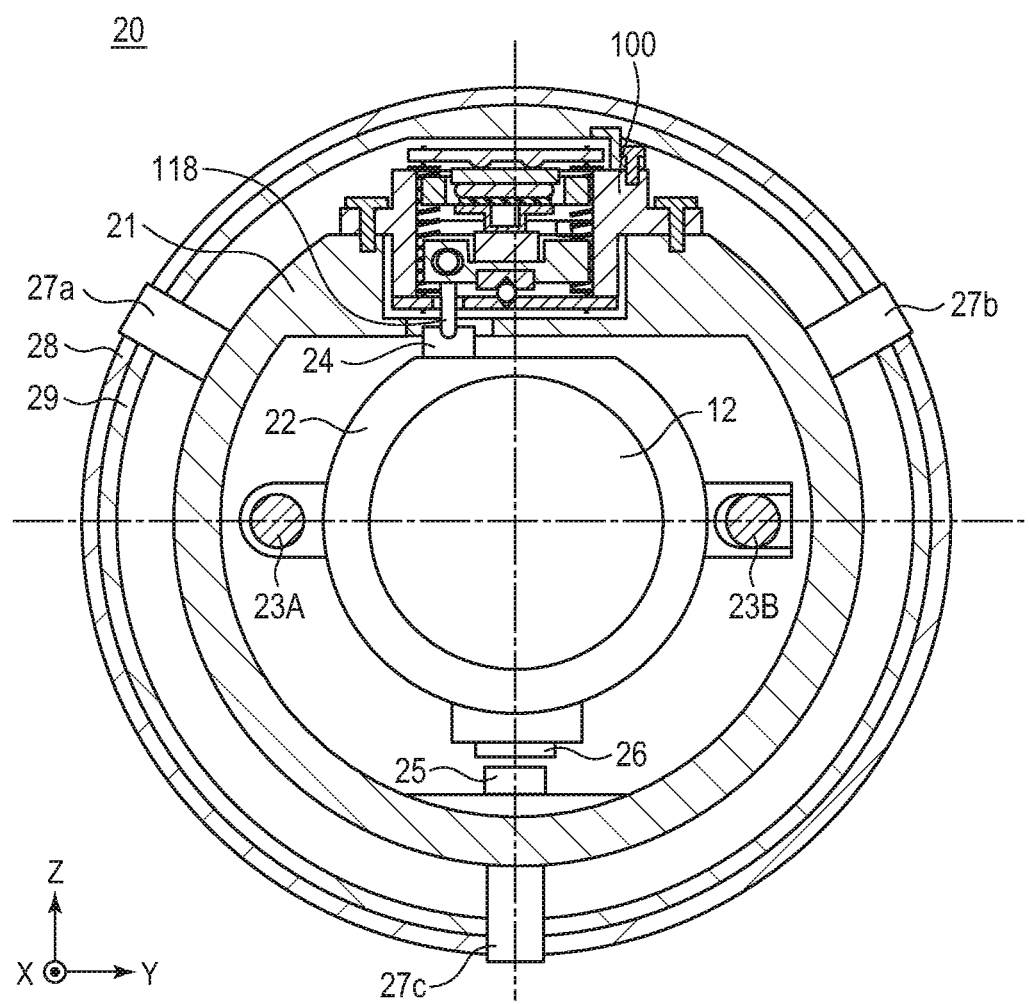
FIG. 8 is a cross-sectional view illustrating the principal part of a focus unit (20).

FIG. 8 is a cross-sectional view illustrating a principal part of the focus unit 20 which is cut along a plane orthogonal to X direction. A lens barrel 21 has a focus lens barrel 22 held therein and the vibration wave motor 100 fixed thereon in Z direction. The focus lens barrel 22 holds the focus lens part 12 and is held by two guide bars 23A and 23B so as to move in X direction. A connecting part 24 is provided on the focus lens barrel 22. The connecting part 24 is connected to the power drawing part 118 of the vibration wave motor 100 so as to drive the focus lens barrel 22 in X direction.

The lens barrel 21 has an encoder 25 provided thereunder in Z direction. The encoder 25 reads a scale 26 provided under the focus lens barrel 22 in Z direction, so that the position of the focus lens barrel 22 is detected relative to the lens barrel 21.

Moreover, the lens barrel 21 is connected to cam followers 27*a*, 27*b* and 27*c* that are engaged with a cam cylinder 28 having a cam groove and a linear guide cylinder 29 having a linear groove. Thus, the overall lens barrel 21 is movable in X direction according to a zooming operation of the lens drive apparatus 10.

This configuration can prevent deviation of the components of the vibration wave motor 100 and damage to the vibrator 103 even when an impulsive force is applied to the lens drive apparatus 10, thereby keeping satisfactory performance for the motor. The same effect can be obtained by applying the vibration wave motor 200 of the second embodiment to the lens drive apparatus 10.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020884, filed Feb. 8, 2018, which is hereby incorporated by reference herein in its entirety.

What is claimed is:

1. A vibration wave motor comprising:
   a vibrator including a vibrating element having a protrusion part, and a piezoelectric element;
   a friction member; and
   a pressurizing member configured to press the protrusion part of the vibrator and the friction member into contact with each other,
   wherein the vibrator and the friction member are relatively moved in a direction orthogonal to a pressurizing direction of the pressurizing member by vibrations generated on the vibrator,
   wherein the vibrator and the friction member are configured so as to move in parallel with the pressurizing direction with respect to a fixed member that does not move according to the movement of the vibrator and the friction member in the direction of the relative movement, and
   wherein the vibration wave motor further comprises a first restricting portion that restricts a movable amount of the friction member in the pressurizing direction and a second restricting portion that restricts a movable amount of the vibrator in the pressurizing direction, such that the movable amount of the friction member is smaller than the movable amount of the vibrator in the pressurizing direction.

2. The vibration wave motor according to claim 1, wherein the vibrator includes at least a first vibrator and a second vibrator, and the first restricting portion is disposed between the first vibrator and the second vibrator when viewed in the pressurizing direction.

3. The vibration wave motor according to claim 1, further comprising a guide member for guiding the friction member, wherein the friction member rotates about the guide member.

4. The vibration wave motor according to claim 1, further comprising a rolling member for guiding the friction member, wherein the movable amount of the friction member restricted by the first restricting portion is smaller than a size of the rolling member.

5. The vibration wave motor according to claim 1, further comprising a guide mechanism for guiding the relative movement of the vibrator and the friction member,
wherein the guide mechanism includes a first guide part that moves according to the movement of the vibrator and the friction member in the direction of the relative movement, a second guide part that does not move according to the movement of the vibrator and the friction member in the direction of the relative movement, and a rolling member disposed between the first guide part and the second guide part,
one of the first guide part and the second guide part moves in the pressurizing direction according to the movement of the friction member in the pressurizing direction, and
the movable amount of the friction member is restricted by the second first restricting portion so as to prevent the rolling member from deviating from between the first guide part and the second guide part.

6. The vibration wave motor according to claim 1, wherein the friction member moves in the direction of the relative movement and the vibrator is fixed.

7. The vibration wave motor according to claim 1, wherein the one first restricting portion and the second restricting portion are provided in the fixed member.

8. The vibration wave motor according to claim 1, wherein the vibrations are high-frequency vibrations at frequencies of an ultrasonic range, and the vibration wave motor is an ultrasonic motor.

9. A lens drive apparatus comprising:
a vibration wave motor;
a lens part driven by the vibration wave motor; and
a guide member configured to linearly movably hold the lens part,
the vibration wave motor comprising:
a vibrator including a vibrating element having a protrusion part, and a piezoelectric element;
a friction member; and
a pressurizing member configured to press the protrusion part of the vibrator and the friction member into contact with each other,
wherein the vibrator and the friction member are relatively moved in a direction orthogonal to a pressurizing direction of the pressurizing member by vibrations generated on the vibrator,
wherein the vibrator and the friction member are configured so as to move in parallel with the pressurizing direction with respect to a fixed member that does not move according to the movement of the vibrator and the friction member in the direction of the relative movement, and
wherein a movable amount of the friction member in the pressurizing direction is restricted by a first restricting portion and a movable amount of the vibrator in the pressurizing direction is restricted by a second restricting portion such that the movable amount of the friction member is smaller than the movable amount of the vibrator in the pressurizing direction.

10. A vibration wave motor comprising:
a vibrator including a vibrating element having a protrusion part, and a piezoelectric element;
a friction member; and
a pressurizing member configured to press the protrusion part of the vibrator and the friction member into contact with each other,
wherein the vibrator and the friction member are relatively moved in a direction orthogonal to a pressurizing direction of the pressurizing member by vibrations generated on the vibrator,
wherein the vibrator and the friction member are configured so as to move in parallel with the pressurizing direction with respect to a fixed member that does not move according to the movement of the vibrator and the friction member in the direction of the relative movement, and
wherein in a state that a movement of the friction member in the pressurizing direction is restricted by a first restricting portion and a movement of the vibrator in the pressurizing direction is restricted by a second restricting portion, a gap is formed between the protrusion part of the vibrator and the friction member.

11. A driving apparatus comprising:
a vibration wave motor;
a member driven by the vibration wave motor; and
the vibration wave motor comprising:
a vibrator including a vibrating element having a protrusion part, and a piezoelectric element;
a friction member; and
a pressurizing member configured to press the protrusion part of the vibrator and the friction member into contact with each other,
wherein the vibrator and the friction member are relatively moved in a direction orthogonal to a pressurizing direction of the pressurizing member by vibrations generated on the vibrator,
wherein the vibrator and the friction member are configured so as to move in parallel with the pressurizing direction with respect to a fixed member that does not move according to the movement of the vibrator and the friction member in the direction of the relative movement, and
wherein in a state that a movement of the friction member in the pressurizing direction is restricted by a first restricting portion and a movement of the vibrator in the pressurizing direction is restricted by a second restricting portion, a gap is formed between the protrusion part of the vibrator and the friction member.

* * * * *